Aug. 28, 1962 S. C. ROCKAFELLOW ETAL 3,051,825
INTERLOCK SYSTEM FOR ASSURING RESISTANCE
WELDS OF CONSISTENT QUALITY
Filed May 31, 1960 2 Sheets-Sheet 1

INVENTORS.
STUART C. ROCKAFELLOW
THEODORE R. THOMSEN
BY
Woodhams Blanchard & Flynn
ATTORNEYS

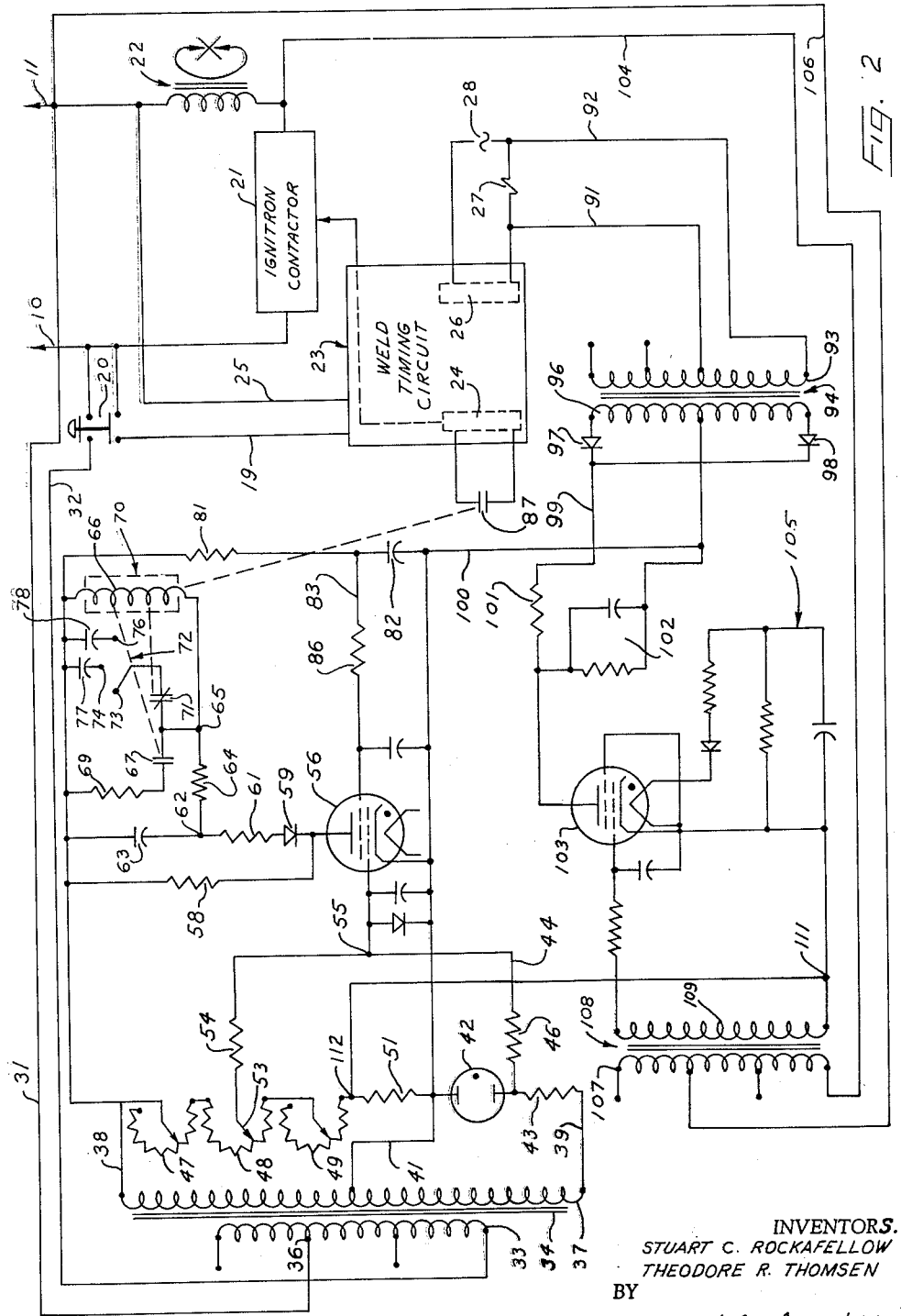

United States Patent Office 3,051,825
Patented Aug. 28, 1962

3,051,825
INTERLOCK SYSTEM FOR ASSURING RESISTANCE WELDS OF CONSISTENT QUALITY
Stuart C. Rockafellow, Plymouth, and Theodore R. Thomsen, Farmington, Mich., assignors to Robotron Corporation, Detroit, Mich., a corporation of Michigan
Filed May 31, 1960, Ser. No. 32,915
18 Claims. (Cl. 219—108)

This invention relates to a welding control system and it relates particularly to a system for controlling a plurality of welding machines operated from a single power source in such a manner as to insure the obtaining of satisfactory welds from each of said machines.

Whenever a number of welding machines are used in a given location, such as in a factory, it is customary, and is usually essential for economic reasons, for several machines to be run from one supply line. Such practice creates a vexing and continuing problem of assuring proper voltage to the input terminals of each of said machines during the time weld current flows. The problem arises from the fact that operation of any one of the welding machines will cause the line voltage to drop by a substantial amount. The amount of line voltage drop may and usually does vary from machine to machine and during the welding cycle of any given machine. If several of the welding machines draw welding current simultaneously, the sum of the line voltage drop caused thereby may be sufficient to cause the lines voltage to be reduced to such a point that it is insufficient to effect a satisfactory weld and the result will be production of so-called "cold" welds.

To illustrate this problem further, it may be assumed that there are ten welding machines all supplied from a constant 460 volt source and that each of said machines during weld current flow causes the line voltage to drop 15 volts. Further, it may be assumed that in order to produce satisfactory welds each one of said machines must be supplied by a line voltage of at least 400 volts. Therefore, it will be seen that not more than four machines may be supplied from said line source at any one time or unsatisfactory welds will result.

Prior attempts to solve this problem include the use of mechanical interlocks which permit only one machine to draw welding current at any one time. This is satisfactory where only two or three welding machines are supplied from a single line voltage source. However, as the number of welding machines increases, so does the complexity of the mechanical interlock system and, further, so does the amount of idle time for the welding machines since only one of them can draw welding current at one time. Further, where, as is a usual situation, the welding machines cause different amounts of line voltage drop, it would be possible to have several machines draw welding current simultaneously without exceeding the permissible total line voltage drop and mechanical interlock systems of the type mentioned above do not permit this. Thus, production time is lost.

In another system, a timing control is provided to permit first one and then another of a group of machines to draw welding current simultaneously for a given time. However, since the operator must initiate operation of any given welding machine and since a substantial time may elapse between successive operations of the same machine, it frequently happens that only one of a given group of machines will be drawing welding current during the time period provided therefor. Thus, the full line voltage is not used as efficiently as possible and loss of production results.

It will be appreciated, therefore, that present systems for operating a plurality of welding machines from a single line power source are not as satisfactory as is desired.

Accordingly, the objects of the invention include the following:

(1) To provide a control system for operating a plurality of welding machines which are supplied from a single power source in order to insure satisfactory welds from each of said machines.

(2) To provide a control system, as aforesaid, which prevents operation of any one of said welding machines when the line voltage available to such machine is below a predetermined minimum.

(3) To provide a control system, as aforesaid, which permits each machine to draw welding current independently of the operation of the others so long as the line voltage is above the predetermined minimum.

(4) To provide a control system, as aforesaid, wherein the line voltage source is connected continuously to each welding machine subject only to its being temporarily and automatically prevented from energizing welding machines not then drawing welding current when and so long as the voltage available to said machines is below a predetermined minimum.

(5) To provide a control system, as aforesaid, which is applicable to a plurality of welding machines each of which draws welding current at regular or irregular intervals with respect to each other.

(6) To provide a control system, as aforesaid, applicable to a situation where the welding current drawn from said source by any one machine varies from time to time or varies from one machine to another.

(7) To provide a control system, as aforesaid, which can be carried out and embodied in relatively simple electrical circuitry.

(8) To provide electrical circuitry for such a system which will be inexpensive to manufacture and which will require a minimum of maintenance and/or repairs.

(9) To provide circuitry, as aforesaid, which can be easily and conveniently used with conventional weld timer circuits of various types and makes.

(10) To provide an electrical circuit, as aforesaid, which will sense the value of the alternating line voltage at a point in the wave form thereof at which welding machines operated by "phased-back" controls will cause a drop in the line voltage so that the effect of the welding machine then drawing welding current on line voltage will be taken into account before operation of another machine is commenced.

(11) To provide an electrical circuit, as aforesaid, which is fast acting so that a voltage drop caused by operation of certain ones of the welding machines will effect a control operation on the other machines within a short time, such as within one cycle.

(12) To provide an electrical circuit, as aforesaid, having lock-in means so that the sensing circuit, once it has started the weld timer of a given machine to cause weld current flow, will be locked in for the rest of the welding sequence of that machine.

(13) To provide an electrical circuit, as aforesaid, having selectable time delay means so that drawing of welding current by the respective machines will be staggered in time after the line voltage reaches the predetermined minimum.

Other objects and purposes of the invention will be apparent to persons acquainted with apparatus of the general type upon reading the following disclosure and inspecting the accompanying drawings.

In the drawings:

FIGURE 2 is a circuit diagram of a sensing circuit embodying the invention, the sensing circuit being shown in association with a conventional welding machine circuit.

The invention has arisen specifically as an answer to a problem in the welding industry and, for the purposes of illustration and description, a welding application of the invention will be assumed. However, it will be apparent that the system and apparatus of the invention will be applicable to other uses wherein a plurality of loads are supplied from a single power source, particularly where said loads are irregular both as to the amount of voltage drop they cause and the times at which they cause same. Examples of such loads are plating, anodizing and induction heating operations.

General Description

In general, the invention is adapted to be used with a series of machines, such as welding machines, which are operated by a single power supply wherein each machine causes a substantial drop in the line voltage during operation thereof. A sensing circuit is associated with each machine and is connected to the supply voltage lines so that the input to the sensing circuit fluctuates in accordance with fluctuations in the line voltage. The sensing circuit includes means responsive to the line voltage and which provides a signal when the voltage is in excess of a predetermined level. The level at which the sensing circuit gives a signal is adjustable. The sensing circuit is connected to the welding machine in such a fashion that a signal therefrom operates means in the welding machine which initiates operation thereof. In this way, operation of the machine will not be initiated until the line voltage being supplied thereto is an excess of a predetermined level.

The sensing circuit is connected to the welding machine so that additional potential is supplied thereto to maintain the signal so long as the machine is drawing current from the line voltage source even though the line voltage drops below the predetermined level. Further, the sensing circuit preferably includes means for blocking the giving of a signal until a predetermined time during the respective half-cycles of the alternating potential source. This is done so that the input to the sensing circuit will reflect the effect on the line voltage caused by operation of other machines, which operation may begin at a point after the beginning of the respective half-cycles. Thus, the operation of other machines is taken into account before a signal to cause operation of the first-mentioned machine is effected. Further, the invention provides adjustable time-delay means in the sensing unit for each of the machines so that the signals given thereby are effective to start operation of the machine with which they are respectively associated at different times in order to stagger the line voltage drops caused thereby and thereby assure that a sudden and excessive potential drop will not be caused by several machines starting to draw welding current simultaneously.

Detailed Description

Figure 1:
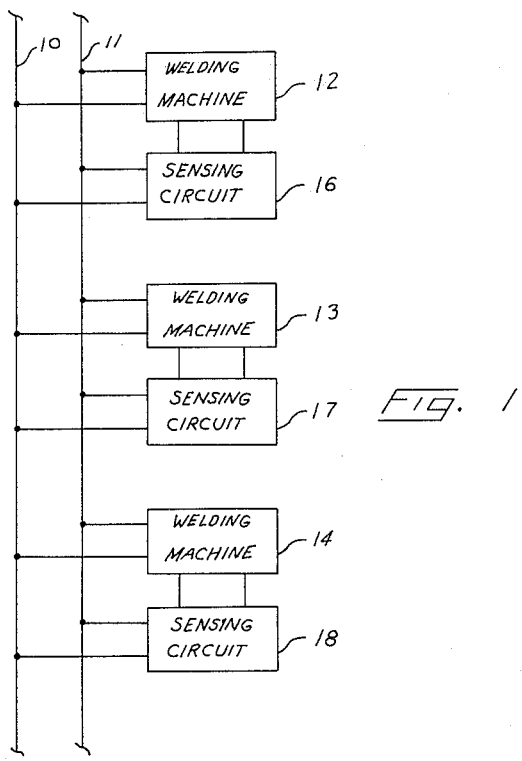
FIGURE 1 is a system layout illustrating the system concept of the invention.

Referring to FIGURE 1, there is schematically disclosed a system embodying the invention. A pair of line conductors 10 and 11 are connected to an A.C. source and here a plurality of welding machines 12, 13 and 14 are connected thereto for drawing power therefrom. While only three welding machines have been disclosed for illustrative purposes, it will be recognized that the invention can be used with any suitable number of welding machines connected to the same line voltage source and, in fact, it is customary in practicing the invention that a larger number, such as from 5 to 10 welding machines, will be connected to the same line source. Sensing circuits 16, 17 and 18 are connected, respectively, to the welding machines 12, 13 and 14 and to the line conductors 10 and 11. The sensing circuits respond to the voltage of the source and when said voltage exceeds a predetermined minimum, each sensing circuit provides a signal to initiate flow of welding current in the welding machine associated therewith.

Referring now to FIGURE 2, which illustrates the connection of a single welding machine and a single sensing circuit to the line conductors, the line conductors 10 and 11 are connected through a suitable control means, such as a conventional ignitron contactor 21, to the primary winding of the welding transformer 22. The secondary winding of the welding transformer is connected to the welding electrodes in a conventional manner. Thus, when the ignitron contactor 21 is conductive, current will flow through the primary winding of transformer 22 and supply heat to the welding electrodes in a conventional manner.

Conduction of the ignitron contactor 21 is controlled by a conventional weld-timing circuit 23. The weld-timing circuit may be of any conventional type, such as that disclosed in U.S. Patent No. 2,776,383. The weld timer is connected by a conductor 19 through a switch 20 to supply line conductor 10 and is connected by a conductor 25 to line conductor 11. The weld timer includes a weld-timer switch 24 of any suitable type which controls the conductivity of the ignitron contactor 21. Thus, when the switch 24 is closed the ignitron contactor will be rendered conductive and weld current will flow. The switch is operated by the sensing unit in a manner to be described hereinbelow. Energization of the weld-timing circuit is controlled by the operator-controlled switch 20 in which case the operator will first close such switch and the sensing circuit will then determine when weld current flows.

The weld-timing circuit 23 also includes a switch 26 which controls application of pressure to the welding electrodes. Here the switch 26 is shown as controlling the supply of potential to a solenoid 27 of a solenoid valve which in turn controls the supply of fluid pressure to the welding electrodes. Potential for operating the solenoid 27 is supplied by a suitable A.C. supply source 28. As will be pointed out in greater detail hereinbelow, when the solenoid valve 27 is operated to close the welding electrodes on the work, a function in the sensing unit will be effected.

A conductor 31 is connected to the supply line 11 and a second conductor 32 is connected through switch 20 to supply line 10. The conductor 32 is connected to one end of the primary winding 33 of a transformer 34. The conductor 31 is selectively connectible to one of the taps on the primary winding 33 depending on the voltage A.C. source and is here shown as being connected to an intermediate tap 36. The secondary winding 37 of the transformer 34 has a pair of conductors 38 and 39 connected to the ends thereof and has a conductor 41 connected to a center tap thereof. A cold-cathode, gas-discharge tube 42 is connected in series with a current-limiting resistance 43 between the conductors 39 and 41. A conductor 44 having a resistance 46 therein is connected to the electrode of the tube 42 which is opposite the conductor 41. Thus, the tube 42 functions as a voltage regulator and a substantially constant voltage appears between the conductor 41 and the conductor 44 regardless of fluctuations in the line voltage in lines 10 and 11.

Conductor 38 is connected to conductor 41 through three series-connected potentiometers 47, 48 and 49 and a fixed resistance 51 connected in series therewith. The slider 53 of potentiometer 48 has a potential with respect to conductor 38 which varies in accordance with fluctuations in the voltage between lines 10 and 11. The slider 53 is connected through a resistance 54 to a junction point 55. The conductor 44 is also connected to the junction point 55 and said junction point is in turn connected to the control grid of the tetrode thyratron 56. The potentials applied from the line 44 and from the slider 53 are of opposite polarity. The potential applied from line 44 is constant and normally tends to hold the thyratron 56 nonconductive while the potential from the slider 53 is variable and tends to make the thyratron conductive. Thus, when the potential on the slider 53 is sufficiently high, the thyratron 56 will be rendered conductive while if the potential on slider 53 is not sufficiently high, indicating that the line voltage has dropped to below the predetermined minimum, the thyratron 56 will be maintained nonconductive.

The cathode of thyratron 56 is connected to the line 41 and the anode thereof is connected through a resistance 58 to the conductor 38. The anode is also connected through a rectifier 59 and a resistance 61 to a junction point 62. The junction point 62 is connected through a relatively small capacitor 63 to the conductor 38. The junction point 62 is also connected through a resistance 64 to a further junction point 65 and thence through the winding 66 of a relay 70 to the conductor 38. The junction point 65 is connected through the normally open contacts 67 of relay 70 and through a resistance 69 to the conductor 38. The junction point 65 is also connected through the normally closed contacts 71 of the relay 70 to a switch 72. One contact 73 of the switch is blind while the other contacts 74 and 76 are connected, respectively, through capacitors 77 and 78 to the conductor 38. The capacitors 77 and 78 are of larger value than capacitor 63 and, for example, may be twice the value and four times the value, respectively, of said capacitor 63. The capacitors 77 and 78 make it possible to delay the time interval between firing of thyratron 56 and energization of the winding 66 of relay 70 which causes same to pull into reverse the normal position of the contacts thereof. Thus, with the switch connected to the blind contact 73, the relay 70 will pull in within one cycle after firing of the thyratron 56. When the switch is connected to contact 74, a predetermined delay, such as two cycles, will be added to this time since the capacitor 77 must be charged before the relay will pull in. Similarly, when the switch is in contact with contact 76, a larger predetermined delay, such as four cycles, will occur due to the longer time involved in charging the capacitor 78. Thus, an adjustable time delay, determined by the setting of switch 72, is provided between the time that the thyratron 56 fires and the time that the winding 66 of relay 70 is energized to cause same to pull in.

The firing of thyratron 56 is not only controlled by the potential on the slider 53 of potentiometer 48 but it is also controlled by the potential applied to the screen grid thereof. A resistance 81 and a capacitance 82 are connected in series between the conductors 38 and 41. A conductor 83 is connected to a point therebetween and thence through a grid resistor 86 to the screen grid. The circuit including the resistances 81 and 86 and the capacitance 82 functions as a resistance-capacitance phase-shift circuit and it maintains the shield grid of the tetrode thyratron 56 negative during the first 90 degrees of the positive half-cycle of the alternating potential applied to the anode of the tube. Thus, the thyratron 56 can fire only during the second 90 degrees of the positive half-cycle of the alternating potential applied to the anode thereof. This phase-shift circuit has been provided to insure that the sensing circuit will sense supply line conditions and will be capable of providing a signal for causing weld current flow only at a point in the wave form which would be affected by welders operated by "phased-back" controls, that is, controls which cause a line-voltage drop during the second 90 degree of the positive half-cycle of the line voltage.

Figure 3:
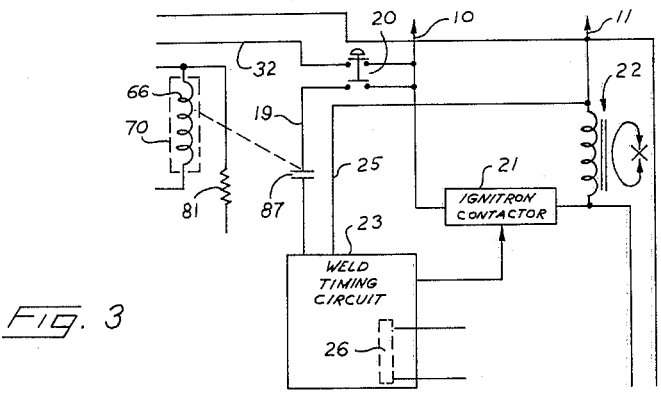
FIGURE 3 is a view of a fragment of FIGURE 2 showing a modification.

Contacts 87 of relay 70 are connected to operate the switch 24 of the weld-timing circuit 23. When the relay 70 is pulled in, the contacts 87 will close and thereby close switch 24 to permit the welding machine to draw welding current from the line voltage. Preferably, the contacts 87 are connected to that portion of the weld-timing circuit 23 which actually controls flow of weld current. Thus, as soon as they are closed welding current can flow. In this manner, the electrodes can be squeezed against the work and then the welding machine can wait until the relay 70 pulls in and then weld current will immediately flow. If desired, however, as shown in FIGURE 3 the contacts 87 could be connected in the conductor 19 as the initiating switch for the entire weld-timing sequence such that when the relay 70 pulls in, the weld timer would effect first the squeeze-timing portion of the welding sequence and then cause weld current to flow. To some extent, this may depend on the particular type of weld-timing circuit with which the sensing unit is utilized. In this regard, it will be noted that the circuit is adapted for use with any suitable weld-timing circuit whose operation is capable of being controlled in the above-described manner.

A pair of conductors 91 and 92 are connected across the solenoid 27 so as to receive power from source 28 when said solenoid is operated and the electrodes are squeezed against the work. The conductors 91 and 92 are connected to the primary winding 93 of a transformer 94. The opposite ends of the secondary winding 96 of the transformer 94 are connected through rectifiers 97 and 98 to a common line 99 which has a resistor 101 therein. A center tap on the secondary winding 96 is connected through a resistance capacitance circuit 102 to the line 99. A conductor 100 connects conductor 41 to the center tap on the secondary winding 96. Thus, the voltage supplied by conductors 91 and 92 is rectified by passing through a conventional capacitor-input full-wave rectifier circuit and is applied to the anode of thyratron 103. Anode voltage will be available for the thyratron 103 only when the solenoid 27 is energized and the welding electrodes are being squeezed against the work.

A pair of conductors 104 and 106 are connected to opposite ends of the primary winding of welding transformer 22 and are in turn connected to the primary winding 107 of the transformer 108. One end of the secondary winding 109 of the transformer 108 is connected through a grid resistor to the control grid of thyratron 103. The other end of the secondary winding 109 is connected through a junction point 111 to the cathode of the thyratron 103. This line also supplies filament voltage for the thyratron through the circuit 105.

Thyratron 103 will have anode potential during the squeeze, weld and hold time of the welding machine. It will be rendered conductive when weld current is flowing and a positive potential is applied to the control electrode thereof from winding 109. The junction point 111 is connected to a junction point 112 which is located between the potentiometer 49 and the resistor 51. When thyratron 103 is conductive, a circuit will exist from conductor 99 through thyratron 103, point 111, point 112, resistance 51, conductor 41, conductor 100 to the center tap of winding 96. This will cause the point 112 to become more positive and this in turn will cause the slider of rheostat 53 to become more positive. This additional positive potential is sufficient to insure that the thyratron 56 remains conductive at all times during the flow of weld current. Thus, once the thyratron 56 conducts and the relay 70 is pulled in, the entire welding sequence will be allowed to finish even though the line voltage may drop below the predetermined minimum.

*Operation*

While the operation of the circuit has been described somewhat above, it will be repeated in order to insure a complete understanding of the invention.

With the work properly positioned between the welding electrodes, the weld-timing circuit 23 can be initiated by the operator-closing switch 20 to make it ready to time the welding sequence through the conventional squeeze, weld, hold and off times. In the FIGURE 2 embodiment the weld timer will operate to squeeze the electrodes against the work but weld current will not flow until relay 70 is pulled in. In the FIGURE 3 embodiment, nothing will happen in the weld timer circuit until the relay 70 is pulled in.

Assuming that the supply line voltage is below the predetermined minimum, the negative voltage applied by the regulated voltage circuit including the tube 42 and the conductor 44 will hold the thyratron 56 nonconductive. Thus, the winding 66 of relay 70 will not be energized and the contacts 87 will be open and this will prevent flow of welding current. As pointed out above, the FIGURE 2 embodiment is adapted for situations in which, upon operator initiation of the start switch 20, the squeeze-time function is performed and then the welding machine merely waits until the contacts 87 are closed. On the other hand, in the FIGURE 3 embodiment contacts 87 are placed in series with the start switch 20 so that even the squeeze-time function is not performed until the relay 70 is pulled in.

When the supply-line voltage reaches the predetermined minimum, the potential in the slider 53 of potentiometer 48 will overcome the biasing potential from the conductor 44 and will place sufficient potential upon the control grid of thyratron 56 to permit conduction thereof. However, the potential on the screen grid of the thyratron, due to the phase-shift circuit provided by resistances 81 and 86 and capacitor 82 will prevent the thyratron 56 from firing until a predetermined time, such as during the second 90 degrees of the positive half-cycle of anode-supply potential to the thyratron 56. When the screen grid becomes positive, the thyratron 56, assuming that the control grid has a potential thereon sufficient to permit conduction thereof, will become conductive.

Upon conduction of the thyratron 56, current will flow through the winding 66 of relay 70 and will cause said relay to pull in. The time at which the relay will pull in and reverse the normal setting of the contacts 67, 71 and 87 thereof will depend on whether and which one of the capacitors 77 or 78 are connected in parallel with said winding. Thus, if only capacitor 63 is functioning as is the case when the switch 72 is in engagement with contact 73, then the relay 70 will pull in within one cycle of the alternating potential source. If capacitor 77 is in circuit a delay of two cycles will be provided and if capacitor 78 is in circuit a delay of four cycles will be provided. As soon as whichever capacitors are in circuit are charged the relay 70 will pull in. This will open contact 71 and take the switch 72 and the capacitors connected thereto out of circuit. It will close contact 67 to place resistance 69 in circuit and it will close contacts 87 to cause the weld-timing circuit to operate.

Since it is possible that the line voltage might diminish after the thyratron 56 is made conductive, which would, if not compensated for, cause the thyratron to become nonconductive and de-energize the relay 70 and reopen the contacts 87 in the middle of a welding cycle, the invention provides circuitry for supplying additional positive potential to the control electrode of thyratron 56 once welding current flows. This circuit includes the transformer 94 energized from the circuit which includes the solenoid 27 of the solenoid valve of the welding machine and which supplies full-wave rectified potential to the anode of thyratron of anode 103 when the solenoid valve is energized which takes place during the squeeze, weld and hold times of the welding machine. Control potential for the control electrode of thyratron 103 is derived from current flowing through the primary winding of the welding transformer and is supplied thereto through the transformer 108. Thus, the thyratron 103 is conductive during positive half-cycles of weld-current flow. When thyratron 103 is conductive junction point 112 is made more positive as described above and this, in turn, makes the slider 53 of potentiometer 48 more positive by an amount sufficient to maintain the thyratron 56 conductive contrary to the biasing potential supplied thereto through conductor 44. Thus, the thyratron 56 will remain conductive as long as weld current flows and the welding cycle will not be interrupted by fluctuations which occur in the line voltage after the thyratron 56 is first made conductive for any given welding cycle.

The potential on the slider 53 of potentiometer 48 necessary to effect conduction of thyratron 56 must be in excess of the minimum voltage required to effect a satisfactory weld plus at least the voltage drop caused by the operation of the particular welding machine which this sensing circuit controls. Since different machines will cause different voltage drops, each sensing circuit must be calibrated separately and such calibration is effected by adjusting the setting of potentiometers 47, 48 and 49.

The sensing units operate independently of each other and independently control the welding machines associated therewith. Since it is conceivable that simultaneous starting of the weld current flow for several machines would diminish the line voltage below the minimum level, although before the machines started operation it was above the minimum level, the invention provides the time-delay means, including the switch 72 and the alternatively selectable capacitors 77 and 78 associated therewith, to insure appropriate time delays in order to avoid the possible simultaneous starting of a sufficient number of machines to cause an unduly great voltage drop. Thus, one of the machines may be set for a one-cycle delay pulling in the relay 70 while others of the machine could be set for two and four-cycle delays, respectively.

It should be noted, further, that the entire operation of the weld timer is also initiated by the operator and it is necessary that the work be properly positioned between the electrodes and that the operator close the start switch before the sensing circuit can have any effect on the weld-timing circuit. Since welding machines operate for relatively short times during welding cycles and a relatively long delay is provided between welding cycles, it is unlikely that a sufficient number of machines will simultaneously be placed in such condition that upon conduction of their associated thyratron 56, they would simultaneously conduct and cause an undue drop in the line voltage. Nevertheless, the invention is specifically provided with means to prevent such from occurring due to the adjustable time-delay means provided.

It should be pointed out that the sensing unit is completely separate from the weld-timing circuit and since conventional weld-timing circuits ordinarily are provided with means, such as switches, for controlling the time during which they draw welding current, it will be apparent that the invention is adaptable for use with a wide variety of conventional weld timers and can be readily adapted to equipment already in the factory of the purchaser.

While a particular preferred embodiment of the invention has been described hereinabove, it will be apparent that the invention contemplates such changes or modifications therein as lie within the scope of the appended claims.

What is claimed is:

1. Circuitry for controlling the operation of a series of electrically energized machines comprising: a pair of input terminals for each machine; a switch for each machine and connected respectively to said pairs of terminals for controlling flow of electrical energy to said machine; a sensing unit for each machine, said sensing unit including means responsive to the voltage of each respectively connected pair of input terminals for providing a signal when said voltage is in excess of a predetermined level; and means responsive to such signal and connected to said switch for causing operation of same so that energy flows only when said voltage is in excess of a predetermined level, said sensing units being independent of each other whereby said machines may operate simultaneously so long as the potentials applied to the input terminals of the respective machines are in excess of the predetermined level for each thereof.

2. Circuitry for controlling the operation of a series of welding machines comprising: a source of potential; a weld-timing control for each welding machine and connected to said source for controlling flow of welding current to said machine; a sensing unit for each welding machine, said sensing unit including means responsive to the potential of said source for providing a signal when said potential is in excess of a predetermined level; and means responsive to such signal and connected to said control for causing operation of same so that weld current flows only when said potential is in excess of a predetermined level, said sensing units being independent of each other whereby said machines may operate simultaneously so long as the potential of said source is in excess of the predetermined level for the respective machines.

3. Circuitry according to claim 2 including means responsive to flow of welding current for supplying additional potential to said sensing unit so that the signal is maintained so long as weld current flows even through said potential drops to or below said predetermined level during weld current flow.

4. Circuitry according to claim 2 wherein said potential is alternating and including means for preventing said sensing unit from giving a signal until a predetermined time during a half-cycle of said source.

5. Circuitry according to claim 2 including adjustable time-delay means in said sensing units so that signals may be given by said sensing units at different times in order to space initiation of flow of welding current in said welding machines.

6. Circuitry for controlling the operation of a series of welding machines comprising: a source of alternating potential connected for supplying welding current to each of said machines; a weld-timing control for each welding machine for controlling flow of welding current; switch means for controlling operation of each of said controls; a sensing unit for each of said controls, said sensing units each including electric valve means, means for normally biasing said valve means nonconductive, means for applying a potential proportional to the potential of said source to said valve means in opposition to said biasing means so that said valve means is rendered conductive when the said potential of said source is above a predetermined value, said switch means being connected in circuit with said valve means for operation thereby when said valve means is conductive, whereby weld current flows only when said potential of said source is above a predetermined value.

7. Circuitry for controlling the operation of a series of welding machines, comprising: a source of alternating potential connected for supplying welding current to each of said machines; a weld-timing control for each welding machine for controlling flow of welding current; switch means for controlling operation of each of said controls; a sensing unit for each of said controls, each said sensing unit including electric valve means, means for normally biasing said valve means nonconductive, means for applying a potential proportional to the potential of said source to said valve means in opposition to said biasing means so that said valve means is rendered conductive when the potential of said source is above a predetermined value, said switch means being connected in circuit with said valve means for operation thereby when said valve means is conductive whereby weld current flows only when said potential of said source is above a predetermined value; means responsive to pressure on the welding electrodes and responsive to flow of welding current between the electrodes for applying a further potential holding said valve means conductive while weld current is flowing.

8. Circuitry according to claim 7 wherein said last-named means includes second electric valve means; means for supplying anode potential to said second electric valve means only when pressure is applied to the welding electrodes; and means for supplying potential to the control electrode of said second valve means to render same conductive only when welding current is flowing whereby said second valve means is rendered conductive and supplies further positive potential to said first-mentioned valve means to maintain same conductive.

9. Circuitry for controlling the operation of a series of welding machines, comprising: a source of alternating potential connected for supplying welding current to each of said machines; a weld-timing control for each welding machine for controlling flow of welding current; switch means for controlling operation of each of said controls; a sensing unit for each of said controls, each sensing unit including valve means, means for normally biasing said valve means nonconductive, means for applying a potential proportional to the potential of said source to said valve means in opposition to said biasing means so that said valve means is rendered conductive when the potential of said source is above a predetermined value; a plurality of selectable time-delay means in circuit with said valve means and with said switch means so that said switch means is operated a predetermined time after said valve means is rendered conductive whereby welding current will flow a predetermined time after said potential of said source is above a predetermined value.

10. Circuitry according to claim 9 wherein said switch means includes a relay having contacts in the weld-timing control for controlling operation thereof; the winding of the relay being connected to the anode of the electric valve means so as to be energized when the valve means is conductive; a plurality of alternatively selectable capacitors connected in parallel with the winding so that they control the time of energization thereof whereby said relay may be energized at selectable time intervals following conduction of the valve means.

11. Circuitry for controlling the operation of a series of welding machines, comprising: a source of alternating potential connected for supplying welding current to each of said machines; a weld-timing control for each welding machine for controlling flow of welding current; switch means for controlling operation of each of said controls; a sensing unit for each of said controls, each said sensing unit including electric valve means, means for normally biasing said valve means nonconductive, means for applying a potential proportional to the potential of said source to said valve means in opposition to said biasing means so that said valve means is rendered conductive when the potential of said source is above a predetermined value; means for supplying an additional potential to said valve means phase shifted with respect to said source of alternating potential so that said valve means is maintained nonconductive unitl a predetermined time in the wave form of said source of alternating potential, whereby said valve means is rendered conductive at a predetermined point during the wave form of the alternating voltage if the potential of said source is above a predetermined value and such will effect flow of welding current.

12. Circuitry according to claim 11 in which said valve means is a tetrode, said biasing means and said means for applying a potential proportional to the potential of the source being connected for applying potential to the control electrode of the tetrode; a phase-shift circuit for providing a potential phase shifted with respect to the potential of said alternating source and connected to the screen grid of the tetrode so as to prevent conduction thereof until a predetermined point in the wave form of the alternating potential from said source.

13. A sensing unit for controlling the operation of a welding machine, comprising: a thyratron having an anode, a cathode and control electrode; biasing means connected to the control electrode of said thyratron for normally maintaining same nonconductive; means responsive to the potential of the source of alternating potential for applying a positive potential to the control electrode of said thyratron to render said thyratron conductive when the potential of said source is above a predetermined value; a relay having a winding and contacts, the winding of said relay being connected to the anode of said thyratron so that conduction thereof will effect energization of the relay and reversal of the normal position of the contacts thereof, one set of said contacts being adapted to control operation of the welding timer for the welding machine.

14. A sensing circuit according to claim 13 in which the potential proportional to the potential of said source is applied to the control electrode of the thyratron through a plurality of adjustable resistances whereby the thyratron may be operated with source potentials of varying values.

15. Circuitry for controlling the operation of a series of electrically energized machines, comprising: a source of potential connected for simultaneously supplying electrical energy to all of said machines, operation of any one of said machines being effective to cause a drop of the potential supplying the other machines; switch means for each machine connected between said machine and said source for controlling flow of electrical energy to said machine; a sensing unit for each machine, said senssing unit including potential sensitive means connected to said source and also connected to said switch means for effecting operation thereof when the potential of said source is at or above a predetermined level whereby operation of said machines may be initiated independently of each other so long as the potential of said source is at or above said predetermined level for the respective machines.

16. A sensing unit for controlling the initiation of operation of an electrically energized machine supplied from a source of potential, comprising: electric switch means; biasing means for normally holding said switch means in one condition of conductivity; means responsive to the potential of said source for applying to said switch means a potential proportional to the potential of said source whereby said switch means is placed in another condition of conductivity when the potential of said source is at or above a predetermined level; further switch means for initiating operation of the machine in response to said first-named switch changing from said one condition of conductivity to said another condition; and means responsive to the operation of said machine for supplying a further potential to one of said switch means during the operating cycle of said machine to maintain the supply of potential thereto for the operating cycle thereof.

17. A sensing unit according to claim 16 in which said machine is a welding machine having welding electrodes which are adapted to be squeezed against the work and in which said means for supplying further potential includes means responsive to flow of welding current and means responsive to squeezing of the electrodes against the work, which two last-named means cooperate to provide said further potential.

18. A sensing unit for controlling the initiation of operation of an electric resistance welding machine, comprising; electric switch means having control electrode means; biasing means for applying a potential on said control electrode means to normally hold said switch means in one condition of conductivity; means responsive to the potential of the source supplying the welding machine for applying on said control electrode means a potential proportional to the potential of the source and opposing that of said biasing means whereby said switch means is placed in another condition of conductivity when the potential of said source is at or above a predetermined level; further switch means connected in circuit with said first named switch means; time delay means in circuit with both of said switch means whereby said further switch means is actuated a predetermined time after said first-named switch means is placed in said another condition, said further switch means being connected to initiate flow of welding current; and means responsive to flow of welding current to maintain said further switch means in said actuated condition to thereby maintain supply of electrical energy to said welding machine during the operation thereof.

References Cited in the file of this patent

UNITED STATES PATENTS

| | | |
|---|---|---|
| 2,039,851 | Silverman | May 5, 1936 |
| 2,305,773 | Hagedorn | Dec. 22, 1942 |
| 2,473,915 | Slepian | June 21, 1949 |
| 2,496,446 | Dean | Feb. 7, 1950 |
| 2,679,623 | Wyman | May 25, 1954 |